United States Patent
Kataoka et al.

(10) Patent No.: US 10,598,561 B2
(45) Date of Patent: Mar. 24, 2020

(54) ROTATIONAL SOLID

(71) Applicant: KABUSHIKI KAISHA TOYOTA JIDOSHOKKI, Kariya-shi, Aichi-ken (JP)

(72) Inventors: Nariyuki Kataoka, Kariya (JP); Akira Hayakawa, Kariya (JP); Hidetoshi Harima, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 84 days.

(21) Appl. No.: 15/558,037

(22) PCT Filed: Feb. 29, 2016

(86) PCT No.: PCT/JP2016/056083
§ 371 (c)(1),
(2) Date: Sep. 13, 2017

(87) PCT Pub. No.: WO2016/147849
PCT Pub. Date: Sep. 22, 2016

(65) Prior Publication Data
US 2018/0058971 A1 Mar. 1, 2018

(30) Foreign Application Priority Data
Mar. 19, 2015 (JP) .................................. 2015-056489

(51) Int. Cl.
*G01M 1/34* (2006.01)
*F01D 5/04* (2006.01)
(Continued)

(52) U.S. Cl.
CPC ............... *G01M 1/34* (2013.01); *F01D 5/027* (2013.01); *F01D 5/043* (2013.01); *G01M 1/22* (2013.01);
(Continued)

(58) Field of Classification Search
CPC .......... G01M 1/34; G01M 1/22; F01D 5/043; F01D 5/027; F01D 25/285; F01D 25/06; F04D 29/662; F04D 29/284
See application file for complete search history.

(56) References Cited

U.S. PATENT DOCUMENTS

| | | | | |
|---|---|---|---|---|
| 3,811,327 A | * | 5/1974 | Hack ...................... | G01M 1/22 |
| | | | | 73/465 |
| 4,262,251 A | * | 4/1981 | Fujishiro ................. | F02P 17/02 |
| | | | | 324/166 |

(Continued)

FOREIGN PATENT DOCUMENTS

| | | |
|---|---|---|
| JP | 57-200831 A | 12/1982 |
| JP | 2003302304 A | 10/2003 |

(Continued)

OTHER PUBLICATIONS

English Translation of JP57-200831.*

(Continued)

*Primary Examiner* — Helen C Kwok
(74) *Attorney, Agent, or Firm* — Sughrue Mion, PLLC

(57) ABSTRACT

A rotating body, which rotates about an axis, includes a recessed reference mark and at least one recessed dummy mark. The reference mark is provided on the surface of the rotating body, serves as a reference for detecting the rotational phase of the rotating body, and can be detected with an electromagnetic wave. The dummy mark is provided on the surface of the rotating body, and is located at a position separated from the reference mark by an angle greater than 90 degrees about the axis.

5 Claims, 5 Drawing Sheets

(51) Int. Cl.
  *F01D 5/02* (2006.01)
  *G01M 1/22* (2006.01)
(52) U.S. Cl.
  CPC ...... *F05D 2220/40* (2013.01); *F05D 2260/15* (2013.01)

(56) References Cited

U.S. PATENT DOCUMENTS

| | | | | |
|---|---|---|---|---|
| 2002/0008442 A1* | 1/2002 | Komoda | ............... | H02N 2/0045 310/323.13 |
| 2002/0181151 A1* | 12/2002 | Obata | ................ | G11B 19/2009 360/99.08 |
| 2010/0129224 A1* | 5/2010 | Shibata | ................. | F04D 29/284 416/182 |
| 2014/0119960 A1* | 5/2014 | Aiello | ................... | F04D 29/281 417/353 |
| 2015/0354359 A1* | 12/2015 | Matsuda | ................. | F02B 39/00 416/204 A |
| 2015/0361993 A1* | 12/2015 | An | ......................... | F01D 5/027 416/61 |

FOREIGN PATENT DOCUMENTS

| | | |
|---|---|---|
| JP | 2013-15472 A | 1/2013 |
| JP | 2014-141909 A | 8/2014 |
| JP | 5588085 A | 9/2014 |

OTHER PUBLICATIONS

International Preliminary Report on Patentability dated Sep. 19, 2017, in counterpart International Application No. PCT/JP2016/056083.

Japanese Office Action for 2015-056489 dated May 31, 2016.

\* cited by examiner

Proximal Side ←——→ Distal Side
Axial Direction

ROTATIONAL SOLID

CROSS REFERENCE TO RELATED APPLICATIONS

This application is a National Stage of International Application No. PCT/JP2016/056083 filed Feb. 29, 2016, claiming priority based on Japanese Patent Application No. 2015-056489, filed Mar. 19, 2015, the contents of all of which are incorporated herein by reference in their entirety.

TECHNICAL FIELD

The present invention relates to a rotating body that rotates about an axis, and in particular to a surface structure of the rotating body.

BACKGROUND ART

In order to detect the rotational phase of a rotating body, a recessed reference mark that can be detected with an electromagnetic wave such as light is provided on the surface of the rotating body in some cases. However, providing such a recessed reference mark will result in non-uniform weight balance of the rotating body the rotating direction. As a result, an imbalance occurs in the rotating body, which may cause the rotating body to vibrate.

In such a case, the amount of imbalance in the rotating body can be reduced by the imbalance correcting method described in Patent Document 1, for example. In the method described in Patent Document 1, first, the amount of imbalance in a rotating body is measured, and a section of the rotating body is cut and removed based on the measurement result so as to cancel the imbalance. In particular, the method of Patent Document 1 claims to effectively reduce the amount of imbalance by cutting and removing two or more sections of the rotating body when removal of one section is not sufficient to cancel the imbalance.

PRIOR ART DOCUMENT

Patent Document

Patent Document 1: Japanese Laid-Open Patent Publication No. 2013-15472

SUMMARY OF THE INVENTION

Problems that the Invention is to Solve

The technique of Patent Document 1 reliably reduces the amount of imbalance even if a rotating body of which the amount of imbalance is large and is effective in this respect. However, cutting and removing two or more sections of the rotating body tends to increase the number of steps required for correction of imbalance. In order to reduce the number of steps required for correction of imbalance, it is necessary to make the amount of imbalance in the rotating body small in advance when forming the rotating body. However, Patent Document 1 does not disclose reduction in the amount of imbalance in the rotating body prior to correction of imbalance.

Accordingly, it is an objective of the present invention to reduce the amount of imbalance in a rotating body that has a recessed reference mark on the surface.

Means for Solving the Problems

To achieve the foregoing objective and in accordance with one aspect of the present invention, a rotating body that rotates about an axis is provided. The rotating body includes a recessed reference mark and at least one recessed dummy mark. The recessed reference mark is provided on a surface of the rotating body and can be detected with an electromagnetic wave. The reference mark serves as a reference for detecting a rotational phase of the rotating body. The recessed dummy mark is provided on the surface of the rotating body. The dummy mark is separated from the reference mark by an angle greater than 90 degrees about the axis.

MODES FOR CARRYING OUT THE INVENTION

Figure 1:
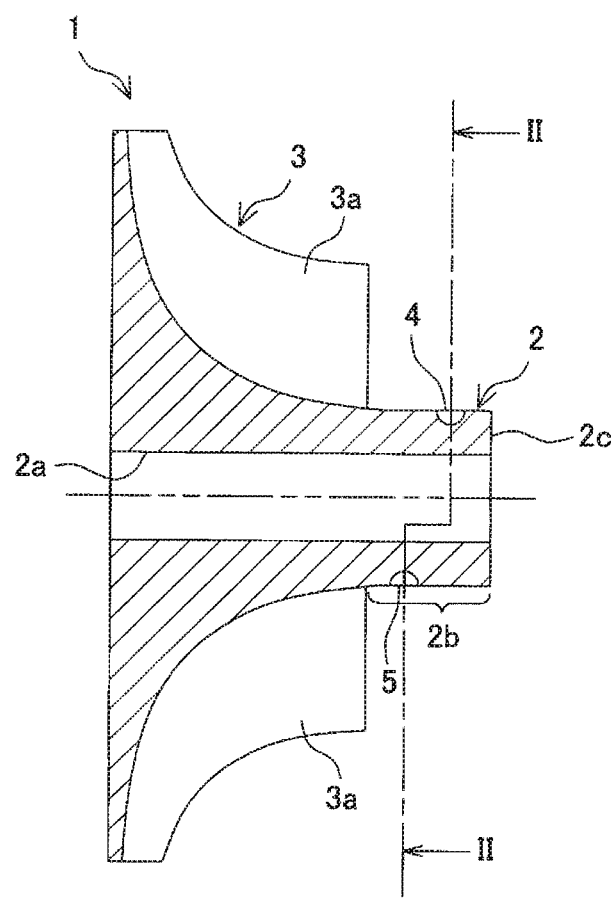
FIG. 1 is a cross-sectional view taken along an axis of an impeller according to one embodiment.
Figure 2:
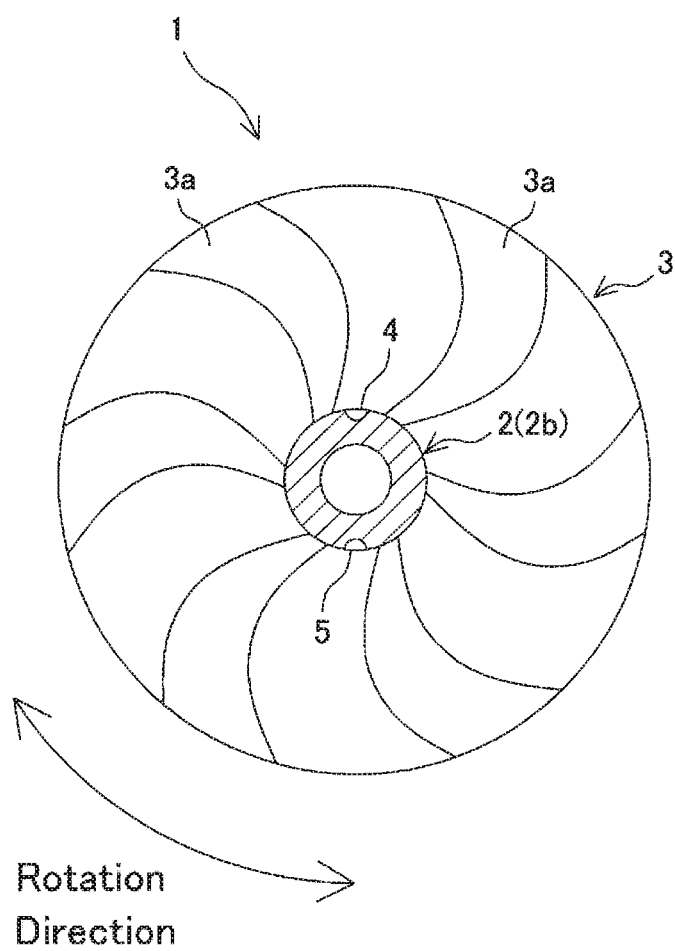
FIG. 2 is a cross-sectional view as viewed in the direction indicated by arrows II-II in FIG. 1.

Hereinafter, a rotating body according to one embodiment of the present invention will be described with reference to the drawings. In the present embodiment, the rotating body is an impeller 1. FIG. 1 is a cross-sectional view taken along an axial direction of the impeller 1 according to the present embodiment, and FIG. 2 is a cross-sectional view as viewed in the direction indicated by arrows II-II in FIG. 1. The present invention is not limited to an impeller, but may of course be applied to other rotating bodies.

The impeller 1 of the present embodiment is used as a compressor of a turbocharger provided in an automobile, and is manufactured by machining aluminum (or aluminum alloy). The impeller 1 has a boss 2, which extends in the axial direction of the impeller 1, and blades 3a, which extend radially outward from the boss 2. The blades 3a constitute a blade portion 3. The axial direction of the impeller 1 will hereinafter be simply referred to as an axial direction. The boss 2 has inside a through-hole 2a, into which a rotary shaft (not shown) is inserted. The through-hole 2a extends in the axial direction. The rotary shaft inserted into the through-hole 2a is fixed to the boss 2 with a nut or the like. In FIGS. 1 and 2, the shape of the blades 3a is shown in a simplified manner and does not represent the accurate shape.

The boss 2 has a distal end region 2b located closer to the distal end (the right side as viewed in FIG. 1) in the axial direction than the blade portion 3. The boss 2 also has a reference mark 4, which is a hemispherical recess, and a dummy mark 5, which has the same shape as the reference mark 4, on the outer peripheral surface of the distal end region 2b. In other words, the reference mark 4 and the dummy mark 5 are provided on the surface (peripheral surface) of the impeller 1. The reference mark 4 is a mark used to detect the rotational phase of the impeller 1. In contrast, the dummy mark 5 is not used to detect the rotational phase of the impeller 1. The dummy mark 5 is a mark for canceling the imbalance in the impeller 1 caused by providing the reference mark 4. In the present embodiment, the number of the dummy mark 5 is one.

Figure 3A:
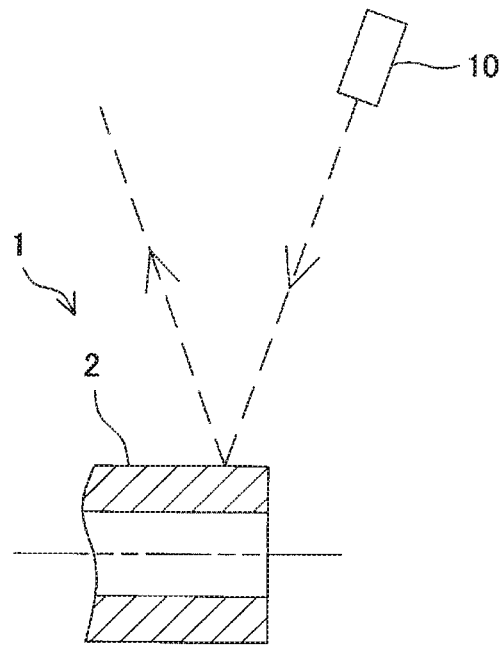
FIGS. 3A and 3B are explanatory diagrams showing the principle of detection of a rotational phase.
Figure 3B:
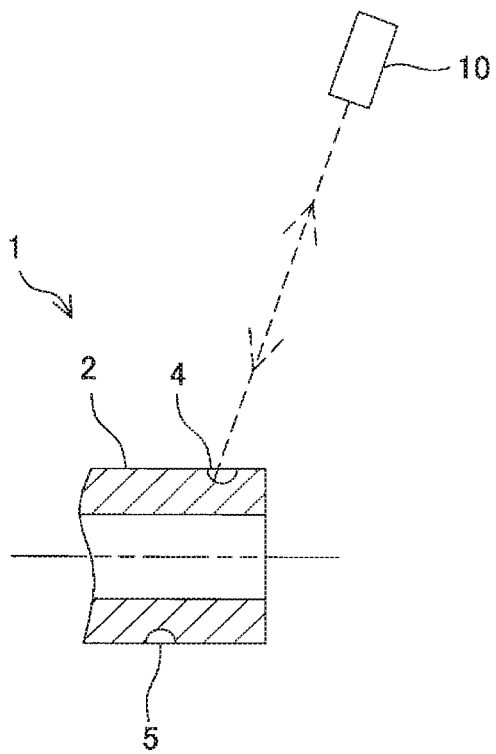

FIGS. 3A and 3B are explanatory diagrams showing the principle of detection of a rotational phase. The rotational phase of the impeller 1 is detected by a phase detection sensor 10 arranged radially outside the impeller 1. The phase detection sensor 10 is a sensor including a light emitter (not shown) and a light receiver (not shown). The light emitter emits light, which is a kind of electromagnetic waves, and the light receiver receives light. The phase detection sensor 10 is arranged such that the light emitted from the light emitter is obliquely incident on the reference mark 4.

As shown in FIG. 3A, when the light emitted from the phase detection sensor 10 is incident on the outer peripheral surface of the boss 2 where the reference mark 4 is not provided, the incident light is substantially specularly reflected. Thus, basically, the phase detection sensor 10 does not detect the reflected light. In contrast, as shown in FIG. 3B, when the light emitted from the phase detection sensor 10 is incident on the reference mark 4, the incident light is not specularly reflected, and at least some of the reflected light is returned the phase detection sensor 10 to be detected by the phase detection sensor 10. That is, the reference mark 4 is detected by the phase detection sensor 10, and the rotational phase of the impeller 1 is determined based on the detection timing.

The dummy mark 5 is a recess having the same hemispherical shape as that of the reference mark 4. In the present embodiment, the dummy mark 5 is provided at a position separated from the reference mark 4 (in the rotation direction) by 180 degrees about the axis of the impeller 1. The rotation direction of the impeller 1 includes the forward rotation direction and the reverse rotation direction. The phrase "about the axis of the impeller 1" will hereinafter be simply referred to as "about the axis." In the axial direction, the dummy mark 5 is located closer to the proximal end (the left side as viewed in FIG. 1) of the boss 2 than the reference mark 4, so that the light emitted from the phase detection sensor 10 is not incident on the dummy mark 5 (See FIG. 3B).

Figure 4:
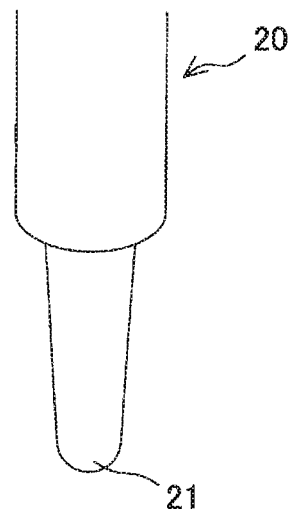
FIG. 4 is a perspective view showing a distal shape of a cutting tool for a machining process.

FIG. 4 is a perspective view showing a distal shape of a cutting tool for a machining process. The cutting tool 20 includes a semispherical distal end 21. The distal end 21 is brought into contact with the material while being rotated to perform cutting. The cutting tool 20 is attached to an NC machine (not shown) and is used in automatic cutting by NC programs. The reference mark 4 and the dummy mark 5 are formed by NC processing using the cutting tool 20, and the recessed shape of the reference mark 4 and the dummy mark 5 corresponds to (matches with) the shape of the distal end 21 of the cutting tool 20.

Advantages

As described above, the impeller 1 (rotating body) of the present embodiment has on the surface the recessed reference mark 4 and at least one recessed dummy mark 5. The reference mark 4 serves as a reference for detecting the rotational phase. The dummy mark 5 is located at a position displaced from the reference mark 4 by an angle greater than 90 degrees about the axis. In other words, on the surface of the impeller 1, at least one dummy mark is provided at a position separated from the reference mark 4 in the rotation direction by 90 to 270 degrees (not including end points). Therefore, the imbalance occurring in the impeller 1 due to the existence of the reference mark 4 is canceled out by the dummy mark 5, and the amount of imbalance in the impeller 1 is reduced. As a result, correction of the imbalance in the impeller 1 becomes unnecessary, or the amount of correction is significantly reduced even if correction of imbalance is required.

Also, the reference mark 4 and the dummy mark 5 are arranged at equal intervals (equal angular intervals) about the axis. The weight distribution of the impeller 1 about the axis is uniformized, so that the amount of imbalance in the impeller 1 is reduced more effectively.

In the case where the dummy mark 5 is arranged at a position 180 degrees apart from the reference mark 4 about the axis as in the present embodiment, the dummy mark 5 readily cancels the imbalance in the impeller 1 caused by providing the reference mark 4.

In the present embodiment, the reference mark 4 and the dummy mark 5 are provided on the outer peripheral surface of the boss 2. This configuration facilitates processing of the reference mark 4 and the dummy mark 5. The reason is that the area of the outer peripheral surface of the boss 2 is generally larger than the area of the end face of the boss 2 and processing is easy to perform on the peripheral surface.

Further, in the present embodiment, the dummy mark 5 is arranged at a position different from the reference mark 4 in the axial direction. Thus, the light emitted from the phase detection sensor 10 does not enter the dummy mark 5, and the dummy mark 5 is not detected by the phase detection sensor 10. Therefore, the phase detection sensor 10 detects only the reference mark 4, and the rotational phase is easily determined based on the detection timing.

Further, in the present embodiment, the reference mark 4 is located closer to the distal end in the axial direction than the dummy mark 5. Thus, as shown in FIG. 3A, the light specularly reflected by the outer peripheral surface of the boss 2 is prevented from being reflected by the blade portion 3 and returning to the phase detection sensor 10. Therefore, erroneous detection of the reference mark 4 is prevented, which improves the detection accuracy of the rotational phase.

Further, in the present embodiment, the reference mark 4 and the dummy mark 5 have a shape that matches with the shape of the distal end 21 of the cutting tool 20. Thus, it is possible to simultaneously form the reference mark 4 and the dummy mark 5 with the cutting tool 20 in the step for manufacturing the impeller 1 through a machining process. This shortens the time required for manufacturing the impeller 1.

Other Embodiments

The present invention is not to be limited to the above-described embodiment, but may be modified within the scope of the invention. That is, the elements of the above-described embodiment may be combined or modified as necessary.

For example, in the above-described embodiment, the dummy mark 5 is provided at a position separated from the reference mark 4 by 180 degrees about the axis. However, the dummy mark 5 may be provided at another position as long as that position is apart from the reference mark 4 by an angle greater than 90 degrees about the axis, that is, any position in the lower half region of the boss 2 in FIG. 2. The dummy mark 5 at such a position has an effect of canceling the imbalance caused by providing the reference mark 4.

In the above embodiment, the number of the dummy mark 5 is one, but the number of the dummy marks 5 is not limited to one but may more than one. For example, when two dummy marks 5 are provided in the boss 2, the dummy marks 5 are provided at positions separated from the reference mark 4 by 120 degrees on either side of the reference mark 4 about the axis. When two or more dummy marks 5 are provided in the boss 2, at least one dummy mark 5 needs to be at a position separated from the reference mark 4 by an angle greater than 90 degrees about the axis, that is, in the lower half region of the boss 2 in FIG. 2. In this case, other dummy marks 5 may be located at a position separated from the reference mark 4 by angles less than 90 degrees about the axis, that is, in the upper half region of the boss 2 in FIG. 2. Further, two or more dummy marks 5 may be provided at the same position in the axial direction, or may be provided at different positions in the axial direction.

In the above-described embodiment, the dummy mark 5 is arranged at a position different from the reference mark 4 in the axial direction. However, it is also possible to provide the dummy mark 5 at the same position as the reference mark 4 in the axial direction. In this case, the phase detection sensor 10 detects the reference mark 4 and the dummy mark 5. However, by arranging the reference mark 4 and the dummy mark 5 at unequal intervals about the axis, there will be differences in time intervals between detections. As a result, it is thus possible to determine whether the mark detected by the phase detection sensor 10 is the reference mark 4 or the dummy mark 5, so that the rotational phase is detected.

Figure 5:
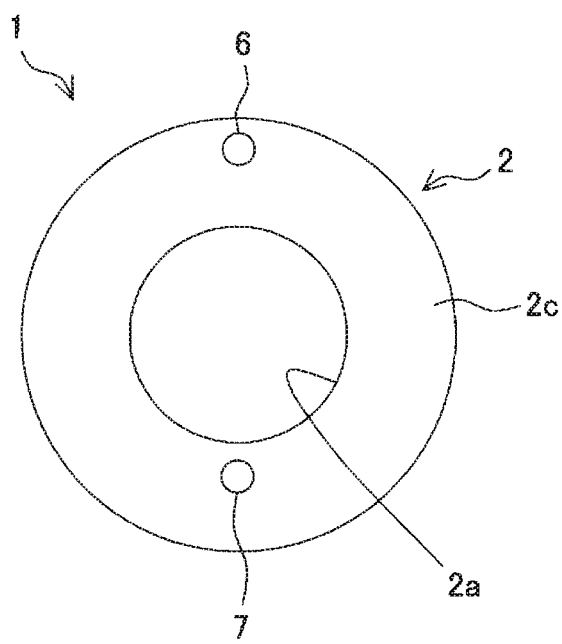
FIG. 5 is a front view of the end face at the distal end in the axial direction of a boss according to another embodiment.
Figure 6:
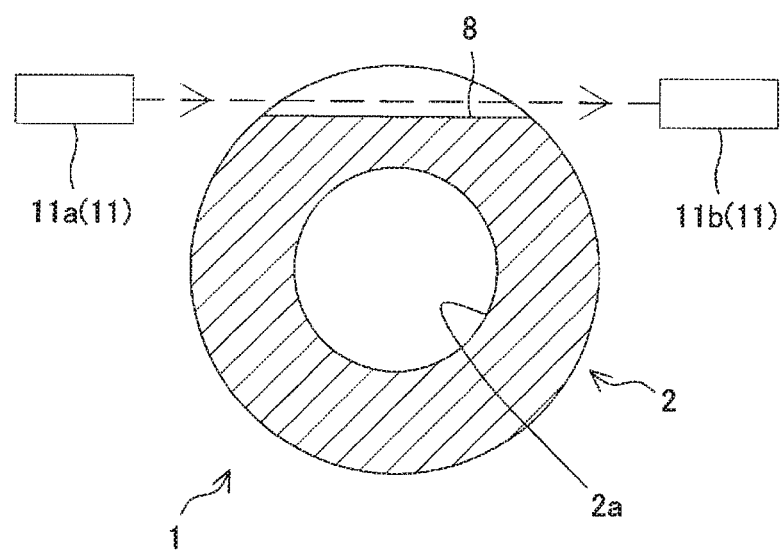
FIG. 6 is a diagram schematically showing a rotational phase detection sensor according to still another embodiment.

In the above-described embodiment, the reference mark 4 and the dummy mark 5 are provided on the peripheral surface of the impeller 1. However, the reference mark 4 and the dummy mark 5 may be provided on a surface of the impeller 1 other than the peripheral surface, for example, on an end face 2*c* (see FIG. 1) at the distal end in the axial direction of the boss 2. In this case, if a dummy mark 7 is provided at a position different from a reference mark 6 in the radial direction, the light emitted toward the reference mark 6 does not enter the dummy mark 7, so that the rotational phase is easily detected. In FIG. 5, the reference mark 6 and the dummy mark 7 are arranged at equal angular intervals about the axis.

In the above-described embodiment, a so-called reflection type phase detection sensor 10, which detects the reference mark 4 with reflected light, is employed, but a sensor other than the reflection type sensor may be used. For example, a transmission type phase detection sensor 11 may be used, in which a light emitter 11*a* and a light receiver 11*b* are arranged to face each other with the boss 2 in between. In this case, a reference mark 8 has a groove shape provided in part in the circumferential direction. This configuration allows the light emitted from the light emitter 11*a* to pass through the reference mark 8 and reach the light receiver 11*b*, so that the reference mark 8 is detected by the phase detection sensor 11.

The shapes of the reference mark 4 and the dummy mark 5 are not limited to those shown in the above embodiments as long as the amount of imbalance in the impeller 1 is reduced. For example, the reference mark 4 and the dummy mark 5 may have a rectangular parallelepiped shape or the like. Alternatively, the reference mark 4 and the dummy mark 5 may have different shapes.

The invention claimed is:

1. A rotating body that rotates about an axis, comprising:
a recessed reference mark that is provided on a surface of the rotating body and can be detected with an electromagnetic wave, wherein the reference mark serves as a reference for detecting a rotational phase of the rotating body; and
at least one recessed dummy mark provided on the surface of the rotating body, wherein the dummy mark is separated from the reference mark by an angle greater than 90 degrees about the axis, wherein,
the rotating body is an impeller,
the rotating body includes
a boss that extends in an axial direction thereof, and
a blade portion that extends radially outward from the boss,
the boss includes a distal end region that is located closer to a distal end in the axial direction than the blade portion,
the reference mark and the dummy mark are provided in the distal end region,
the reference mark and the dummy mark are provided on a peripheral surface of the boss and
the reference mark is located closer to the distal end in the axial direction than the dummy mark.

2. The rotating body according to claim 1, wherein the reference mark and the dummy mark are arranged at equal angular intervals about the axis.

3. The rotating body according to claim 1, wherein the dummy mark is provided at a position separated from the reference mark by 180 degrees about the axis.

4. The rotating body according to claim 1, wherein the reference mark and the dummy mark have a shape that matches with a shape of a distal end of a cutting tool that is used to machine the impeller.

5. The rotating body according to claim 1, wherein the reference mark and the dummy mark have a same shape.

* * * * *